United States Patent
Penrose et al.

(10) Patent No.: US 10,956,684 B2
(45) Date of Patent: *Mar. 23, 2021

(54) TOPIC KERNELIZATION FOR REAL-TIME CONVERSATION DATA

(71) Applicant: INTERNATIONAL BUSINESS MACHINES CORPORATION, Armonk, NY (US)

(72) Inventors: Andrew T. Penrose, Castleknock (IE); Jonathan Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,889

(22) Filed: Sep. 23, 2019

(65) Prior Publication Data

US 2020/0019612 A1    Jan. 16, 2020

Related U.S. Application Data

(63) Continuation of application No. 15/897,298, filed on Feb. 15, 2018, now Pat. No. 10,606,954.

(51) Int. Cl.
*G06F 40/30* (2020.01)
*G06F 16/35* (2019.01)

(52) U.S. Cl.
CPC ............ *G06F 40/30* (2020.01); *G06F 16/353* (2019.01)

(58) Field of Classification Search
CPC ...... G06F 40/20; G06F 40/30; G06F 16/3329; G06F 16/353; G06F 16/345
See application file for complete search history.

(56) References Cited

U.S. PATENT DOCUMENTS

| | | |
|---|---|---|
| 5,708,822 A | 1/1998 | Wical |
| 7,143,091 B2 | 11/2006 | Charnock |

(Continued)

FOREIGN PATENT DOCUMENTS

WO    2017143091 A1    8/2017

OTHER PUBLICATIONS

Ding et al., "Semi-Supervised Dirichlet-Hawkes Process with Applications of Topic Detection and Tracking in Twitter," 2016 IEEE International Conference on Big Data (Big Data), 2016 (6 pages).

(Continued)

*Primary Examiner* — Andrew C Flanders
(74) *Attorney, Agent, or Firm* — Griffiths & Seaton PLLC

(57) ABSTRACT

Embodiments for text segmentation for topic modelling by a processor. A machine learning mechanism is implemented to enhance one or more topic modelling operations of collected real-time conversation data, the real-time conversation data classified into burst segments or reflection segments; wherein the burst segments comprise successive messages received into the conversation data within a first time interval and the reflection segments comprise multiple messages each received into the conversation data having an inter-arrival time outside the first time interval. A summary of the one or more topic modelling operations is presented on a display to a user according to an output of a text mining analysis implementing the one or more topic modelling operations enhanced by the machine learning mechanism.

20 Claims, 10 Drawing Sheets

(56) References Cited

U.S. PATENT DOCUMENTS

| | | | |
|---|---|---|---|
| 7,533,069 B2 | 5/2009 | Fairweather | |
| 8,037,017 B2 | 10/2011 | Samn | |
| 8,452,772 B1* | 5/2013 | Carpio | G06F 16/285 |
| | | | 707/737 |
| 9,672,827 B1 | 6/2017 | Jheeta | |
| 10,140,260 B2 | 11/2018 | Vasiltschenko et al. | |
| 10,242,019 B1 | 3/2019 | Shan et al. | |
| 10,311,144 B2 | 6/2019 | Bellegarda et al. | |
| 10,606,954 B2* | 3/2020 | Penrose | G06F 16/3329 |
| 2003/0033333 A1* | 2/2003 | Nishino | G06F 16/9562 |
| | | | 715/255 |
| 2003/0055655 A1 | 3/2003 | Suominen | |
| 2005/0278613 A1 | 12/2005 | Morinaga et al. | |
| 2007/0094247 A1* | 4/2007 | Chowdhury | G06F 16/90335 |
| 2009/0287685 A1 | 11/2009 | Charnock et al. | |
| 2010/0138377 A1 | 6/2010 | Wright et al. | |
| 2012/0036080 A1* | 2/2012 | Singer | G06Q 30/02 |
| | | | 705/319 |
| 2012/0137367 A1 | 5/2012 | Dupont et al. | |
| 2013/0232263 A1 | 9/2013 | Kelly et al. | |
| 2014/0365452 A1* | 12/2014 | Ma | G06Q 30/02 |
| | | | 707/706 |
| 2016/0239581 A1 | 8/2016 | Jaidka et al. | |
| 2017/0228445 A1 | 8/2017 | Chiu et al. | |

OTHER PUBLICATIONS

Weng et al., "Latent Semantic Rational Kernels for Topic Spotting on Spontaneous Conversational Speech," 2013 IEEE International Conference on Acoustics, Speech and Signal Processing, 2013 (5 pages).

Weng et al., "Latent Semantic Rational Kernels for Topic Spotting on Conversational Speech," IEEE/ACM Transactions on Audio, Speech, and Language Processing, vol. 22, No. 12, Dec. 2014 (12 pages).

Wang et al., "Labeled LDA-Kernel SVM: A Short Chinese Text Supervised Classification Based on Sina Weibo," 2017 4th International Conference on Information Science and Control Engineering (ICISCE), 2017 (5 pages).

* cited by examiner

| # TOPIC CLUSTERS | CLUSTER TERMS | TOTAL TERMS ANALYZED | UNIQUE TERMS OUTPUT | TOTAL UNREFERENCED TERMS | % UNIQUE (OR TOTAL) | % UNIQUE (OR NON-STOPPED) | % UNIQUE |
|---|---|---|---|---|---|---|---|
| 1 | 10 | 10 | 8 | 8 | 50% | 100% | |
| 1 | 5 | 5 | 5 | 11 | 31% | 63% | |
| 2 | 5 | 10 | 8 | 8 | 50% | 100% | |
| 1 | 10 | 10 | 10 | 39 | 20% | 45% | |
| 2 | 10 | 20 | 16 | 33 | 33% | 73% | |
| 3 | 10 | 20 | 20 | 29 | 41% | 91% | |
| 1 | 5 | 5 | 5 | 44 | 10% | 23% | |
| 2 | 5 | 10 | 8 | 41 | 16% | 36% | |
| 3 | 5 | 15 | 14 | 35 | 29% | 64% | |
| 4 | 5 | 20 | 14 | 35 | 29% | 64% | |
| 5 | 5 | 20 | 18 | 31 | 37% | 82% | |
| 1 | 10 | 10 | 10 | 32 | 24% | 48% | |
| 2 | 10 | 19 | 15 | 27 | 36% | 71% | |
| 3 | 10 | 19 | 14 | 28 | 33% | 67% | |
| 1 | 5 | 5 | 5 | 37 | 12% | 24% | |
| 2 | 5 | 10 | 9 | 33 | 21% | 43% | |
| 3 | 5 | 15 | 12 | 30 | 29% | 57% | |
| 4 | 5 | 19 | 16 | 26 | 38% | 76% | |
| 5 | 5 | 19 | 16 | 26 | 38% | 76% | |

FIG. 6

PSEUDOCODE:

700

```
PRINT('THE NUMBER OF NONSTOPPED WORDS ARE: ' + STR( SUM( NOTSTOPPED ) ) )
PRINT('THE NUMBER OF UNIQUE NONSTOPPED WORDS ARE: ' + STR(LEN(MERGEDSET ) ) )
PRINT('THE NUMBER OF UNIQUE NONSTOPPED & STEMMED WORDS ARE: ' + STR( LEN( DICTIONARY) ) ) +
    ', THIS IS WHAT LDA PERFORMS ANALYSIS ON ')

# DETERMINE THE OPTIMAL BUNDLES FOR 5 AND 10 TERM BUNDLES
NUM_FIVE_BUNDLES = ( INT ( LEN ( DICTIONARY ) /5) + ( LEN ( DICTIONARY ) % 5 > 0 ) )
NUM_TEN_BUNDLES = ( INT ( LEN ( DICTIONARY ) /10) + ( LEN ( DICTIONARY ) % 10 > 0 ) )
NUM_TWENTY_BUNDLES = ( INT ( LEN ( DICTIONARY ) /20 ) + ( LEN ( DICTIONARY ) % 20 > 0 ) )

# PRINT THESE NUMBER
PRINT ('THE NUMBER OF 5 WORD BUNDLES REQUIRED : ' + STR( NUM_FIVE_BUNDLES ) )
PRINT ('THE NUMBER OF 10 WORD BUNDLES REQUIRED : ' + STR( NUM_TEN_BUNDLES ) )
PRINT ('THE NUMBER OF 20 WORD BUNDLES REQUIRED : ' + STR( NUM_TWENTY_BUNDLES ) )
```

ANALYSIS OF ENTIRE CONVERSATION

X DOESN T 5 MINUTES BUILD TAKE LIKE HAPPY PROVIDE
ONE PROBABLY WITHOUT TROUBLE WILL WORK
INTEGRATED SOLUTION HOARY FIGURED
CAN MUCH WELL I386 BINARIES AVAILABLE WANT TEST T
DON
S NOW LET KEEP SEPARATE HACKISH SCRIPT SIMPLE
KBD DEBIAN
SAID SOMETHING 12 16 HOURS LIST
FEEL MERGE JUST GO AHEAD FIX TODAY
PLANNING STAY LATE TONIGHT BUNCH BUG FIXES
WHATEVER EASIEST ALREADY
MANY INTERESTED TESTERS MINOR FIRST MAKE
THINGS TESTED BLIND UPLOADS ATI FLDKIDIDS DRIVER
SKIP KERNEL PART SMALL 2
ALSO UBUNTU USERS HELP 2
ISSUE REMAIN NEXT UPLOAD
NEED CHANGE NAMES X MAJOR CHANGES AHOY HEY
MORNING

- ON AVERAGE 15% - 20% MORE TERMS ARE AVAILABLE FOR ANALYSIS

ANALYSIS OF BURSTS & REFLECTIONS

ATI FLRDKIDIDS DRIVER SCRIPT AHOY HEY
MORNING SKIP KERNEL PART CHANG DRIVER
NAME NVIDIA ONE NOW LET S KEEP SEPARATE
HACKISH OK
SCRIPT ONE MERGED WITHOUT MUCH TROUBLE
HAPPY PROVIDE WILL WORK ONE INTEGRATED
SOLUTION HOARY WHATEVER EASIEST FIGURED
PROBABLY
FEEL HAPPY MERGE JUST GO AHEAD NEED FIX
X TODAY SAID SOMETHING 12 16 HOURS LIST
ISSUES REMAIN NEXT UPLOAD NEED TESTED
SMALL THING MANY INTERESTED TESTERS NOW
MERGE ALREADY WORK YESTERDAY THINGS
KBD DEBIAN BUNCH SMALL BUG FIXES WANT
TEST MUCH CAN BLIND UPLOADS X DOESN T
TAKE LIKE 5 MINUTES BUILD COURSE CAN
CAN ALSO UPLOAD UBUNTU USERS WILL HELP
TEST
2 MAJOR CHANGES TESTED ALREADY S
S JUST SMALL DETAIL NV ATI 2
FIXES MINOR BUG FIRST NEED MAKE TEST
CAN TEST ATI WELL I386 BINARIES AVAILABLE
DON T BUILD
WILL TAKE APPROX 40 MINUTES
WILL AROUND PROBABLY YES
PLANNING STAY LATE TONIGHT BUILDING NOW
OK BRB

TOPIC KERNELIZATION FOR REAL-TIME CONVERSATION DATA

CROSS-REFERENCE TO RELATED APPLICATIONS

This Application is a Continuation of U.S. patent application Ser. No. 15/897,298, filed Feb. 15, 2018.

BACKGROUND OF THE INVENTION

Field of the Invention

The present invention relates in general to computing systems, and more particularly to, various embodiments for topic kernelization for real-time conversation data using a computing processor.

Description of the Related Art

Due to the recent advancement of information technology and the growing popularity of the Internet, a vast amount of information is now available in digital form. Such availability of information has provided many opportunities. Digital and online information such as, for example, communication messaging in real-time has become very popular in recent years.

SUMMARY OF THE INVENTION

Various embodiments for text segmentation for topic modelling by a processor are provided. A machine learning mechanism is implemented to enhance one or more topic modelling operations of collected real-time conversation data, the real-time conversation data classified into burst segments or reflection segments; wherein the burst segments comprise successive messages received into the conversation data within a first time interval and the reflection segments comprise multiple messages each received into the conversation data having an inter-arrival time outside the first time interval. A summary of the one or more topic modelling operations is presented on a display to a user according to an output of a text mining analysis implementing the one or more topic modelling operations enhanced by the machine learning mechanism.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a diagram depicting a summary of text mining analysis in accordance with aspects of the present invention;

FIG. 7 is a diagram depicting pseudocode results using topic modelling operations in accordance with aspects of the present invention;

FIG. 8 is a diagram depicting an output of topic modelling of a conversation using enhanced topic modelling operations in accordance with aspects of the present invention;

DETAILED DESCRIPTION OF THE DRAWINGS

Figure 1:
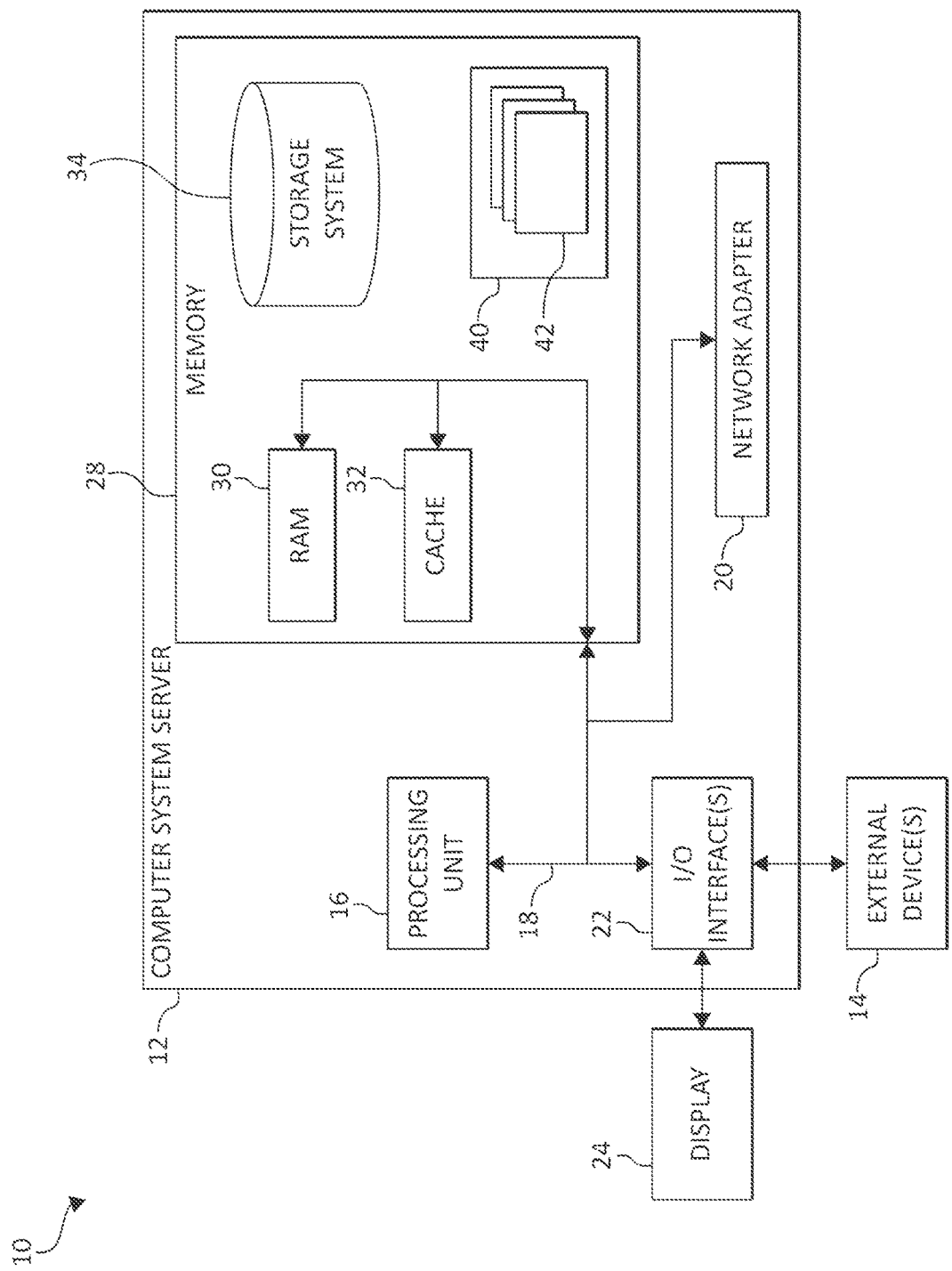
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of various organizations and groups or individuals, including scientific, political, governmental, educational, businesses, and so forth. With the increased use of collaborative and social communication, communication via text-based communication will also increase. For both business and recreational purposes, real-time communication messages (e.g., real-time chat discourses) are part and parcel of modern society. However, for various entities, irrespective of size, using such collaborative and social means of communication can be an overwhelming experience, particularly when large volumes of text-based data are generated by various applications and services.

Moreover, various types of entities (e.g., businesses, organizations, governmental agencies, educational institutions, and the like) often engage in corpus linguistics, which is the study of language as expressed in corpora (i.e., collections) of "actual use" text. The core idea of corpus linguistics is that analysis of expression is best conducted within its natural usage. By collecting samples of writing, researchers can understand how individuals converse with each other. As such, the present invention employs various techniques that assist in understanding and interpreting message based data.

In one aspect, topic modelling may be used to discover a semantic structure within a text corpus. Topic modelling may employ one or more operations to infer the topic and meaning in text based documents and/or discourse. Topic modelling and text mining may be used to gain insights into the various communications. For example, if a business can mine customer feedback on a particular product or service, this information may prove valuable. One of the recommendations when employing text mining/topic modelling techniques is that the more data available for analysis, the better the overall results. However, even with the use of large data, practitioners may have a requirement to text mine a single conversation or small text corpus to infer meaning.

In order for these text models to be successful, a number of steps are applied to pre-process ("wash") the text. These steps include tokenising, stemming, stop words removal, duplicate word removal and lemmatisation. It should be understood that as used herein (in relation to natural language processing "NLP"), the term tokenization may be the process of converting a sequence of characters (e.g., message discourse) into a series of tokens (e.g., strings with an assigned meaning). Therefore, before any analysis is conducted on a text corpus, the text may be divided into linguistic elements such as, for example, words, punctuation, numbers and alpha-numerics. Stop words are words which are filtered out before or after processing of text discourse. Stop words typically refer to the most common words used in a particular language. Stemming is a method of collapsing inflected words to the base or root form of the word. For example, the words: "fishing," "fished," and "fisher," could be reduced to the root word "fish." The benefit of stemming can be seen as follows: If a user is interested in term frequency, it may be easiest to merely count the occurrence of the word fish rather than the word's non-stemmed counterparts. Lemmatisation is the process of grouping together the inflected words, for analysis as a single entity. On the surface, lemmatisation may appear to be the opposite of stemming; however, the main difference is that stemming is unaware of the context of the words and thus, cannot differentiate between words that have other meanings depending on context. For example, the word "worse" has "bad" as its lemma. This link missed by stemming as a dictionary lookup is needed and the word "talk" is the root of "talking." This reference is matched in both stemming and lemmatisation.

However, the drawbacks of these cleaning techniques to pre-process ("wash") the communication data is that once data is pre-processed there are less words available for topic modelling. Conversely, if data were not pre-processed an analysis may incur many issues in terms of inferring topic models due to a lack of data cleansing (e.g., top term=the). The problem is more acute for medium sized text corpora such as real-time chat discourse conversations. For example, the below analysis depicted in Table 1 of three chat conversations shows that after the text was cleaned only 38% (on average) of words where available for analysis.

TABLE 1

| Metric | Conversation 1 | Conversation 2 | Conversation 3 |
|---|---|---|---|
| Total Words | 299 | 436 | 484 |
| Non-Stopped Words | 158 | 239 | 262 |
| Unique Non-Stopped Words | 111 | 168 | 186 |
| # words not analysed | 188 | 268 | 298 |
| % Potential words for analysis | 37% | 39% | 38% |

Accordingly, various embodiments are provided herein to deliver a high degree of summarization of real-time chat discourse. In one aspect, the present invention provides for topic mining operations by partitioning one or more conversations (e.g., real-time chat/messages) using a segmentation operation (e.g., grouping messaging into a burst group or reflective group) and to provide an increased number of words for topic summarization tooling. Moreover, the topic modelling, using the segmentation operation, may provide an increased number of words for text mining but an improved level of readability rather than using an entire message corpus alone.

In one aspect, one or more topic modelling tools may also be employed. For example, Latent Semantic Analysis ("LSA") may be used that allows for a low-dimension representation of documents and words. By constructing a document-term matrix, and using matrix algebra, document similarity (e.g., product of row vectors) and word similarity (e.g., product of column vectors) may be inferred. Another topic modelling tool that may be employed is Latent Dirichlet allocation ("LDA") which is a generative statistical model that allows topics within a text corpus to be represented as a collection of terms. At its core, LDA is a three-level hierarchal Bayesian model, in which each item in an array is modelled as a finite mixture over an underlying set of topics.

In one aspect, the present invention provides for topic kernelization for real-time conversation data using a computing processor. That is, the mechanisms of the illustrated embodiments provide for text segmentation that provides more words for topic modelling and a more precise topic model. In one aspect, one or more real-time communications (e.g., real-time chat/messages) may be analyzed and the inter-arrival times between each of the real-time chats/messages may be recorded. The analyzed real-time chat/messages may be grouped into two groups (bursts and reflections). That is, as the inter-arrival times of instant message posts are determined and/or recorded, the messages may be grouped or "segmented" by, or according to, short and long inter-arrival times. For example, burst segments (e.g., burst segments or those messages categorized as burst segments/messages) may be successive messages within a defined time period such as, for example, a zero minute inter-arrival time (e.g., less than one minute inter-arrival time). Alternatively, reflective segments (e.g., reflective messages) may be those messages having an inter-arrival time equal to or greater than a defined time period such as, for example, those messages with a one minute or greater inter-arrival time.

In other words, one or more real-time communications (e.g., real-time chat/messages) may be analyzed. Those messages with a rapid inter-arrival time may be defined as a burst segment. Those messages with a sedate inter-arrival time may be defined as a reflection segment.

In one aspect, topic kernelization is an operation to segment unstructured communication message(s) (e.g., unstructured chat discourses) into a collection of active and passive messages. For example, burst segments (or those messages categorized as burst segments) may be successive messages within a defined time period such as, for example, a zero minute inter-arrival time (e.g., less than one minute inter-arrival time). Alternatively, reflective messages may be those messages having an inter-arrival time equal to or greater than a defined time period such as, for example, those messages with a one minute or greater inter-arrival time.

The burst segments and reflection segments (e.g., collections of the group of burst segments and group of reflection segments) may then be used to determine optimal topic model sizes. The topic models may be developed using the analysis to provide more precision when ran against the same or other corpus. The burst segments and reflection segments may be used to increase words for analysis using a machine learning mechanism.

In an additional aspect, real-time conversation data may be analyzed and time intervals between messages of the conversation data may be recorded. Each of the messages may be classified into a first group or a second group according to the analyzing. One or more topic modelling operations may be enhanced for text segmentation using the first group and the second group.

Moreover, text mining may be performed on each burst and reflection periods (or groups) and the output terms of the text mining may then be aggregated. For topic text mining, one or more topic modelling operations such as, for example, Biterm may be used. After a conversation has been a) segmented into burst and reflection periods, b) modelled (e.g., periods topic modelled) and c) the results aggregated, the efficacy of the output may be analyzed. The terms output from a topic model operation may not be explicitly designed for a readable summary. Instead, the terms output from a topic model operation may be designed to provide a user an indication of the terms used in a text corpus. However, since a user may desire to understand the output of text mining, the present invention may prepare four sets of text as follows. 1) Each conversation may be topic modelled such as, for example, using Biterm (as a whole) and the mined terms may be output into a single collection. 2) The bursts (e.g., messages grouped as bursts) and reflections (e.g., messages grouped as reflections) from each conversation may be modelled individually, the terms are then aggregated into a single collection. 3) Each conversation with one or more stop words may be removed. 4) The raw conversation (i.e., without any pre-processing) may be modelled as well.

In an additional aspect, each of the text sets (e.g., the four text sets mentioned above) belonging to a single conversation may be summarized. Additionally, an analysis and/or feedback may be collected as to which of the text sets are the easiest to summarize and/or which of the text sets (with all terms topic modelled) or two-grouped text sets (e.g., bursts and reflections topic modelled) are most intuitive and most efficient to summarize. Finally, feedback may be collected (which may use a machine learning algorithm) that describes or indicates (e.g., from a user or application) which are the easiest and/or hardest text sets to summarize (as compared to each other).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
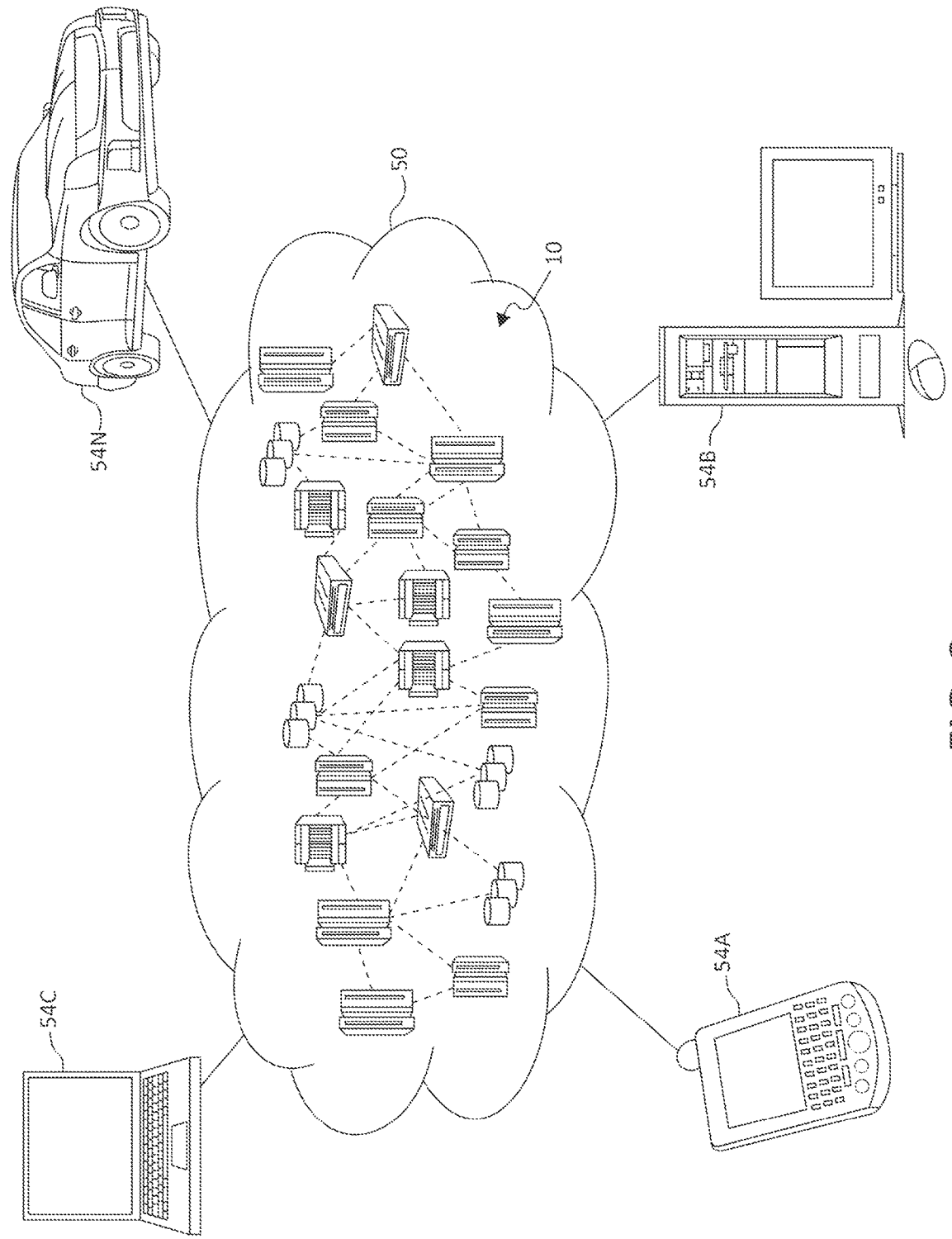
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
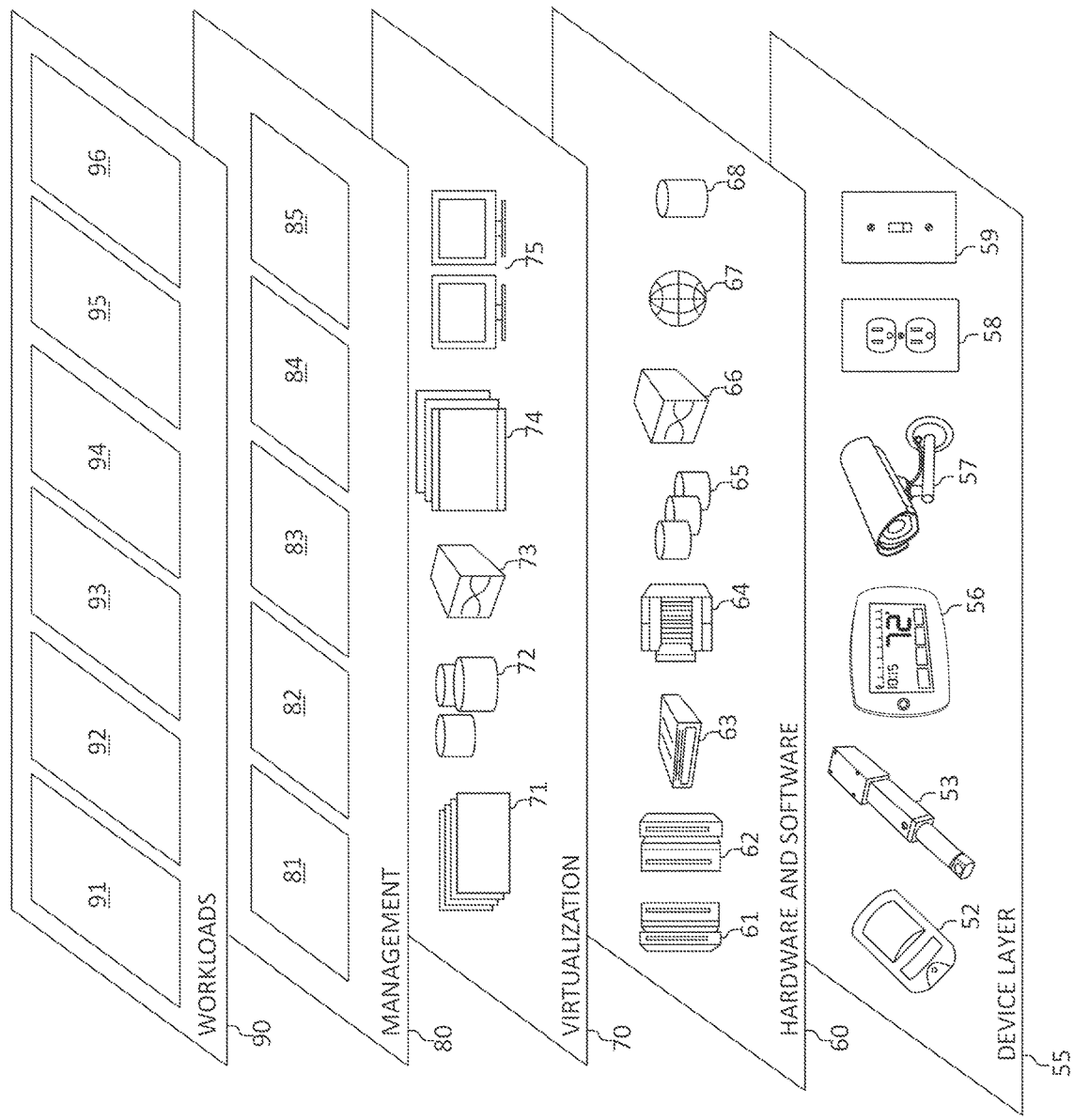
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for topic kernelization. In addition, workloads and functions 96 for topic kernelization may include such operations as data analysis (including data collection and processing from organizational databases, online information, knowledge domains, data sources, and/or social networks/media, and other data storage systems, and predictive and data analytics functions. One of ordinary skill in the art will appreciate that the workloads and functions 96 for topic kernelization may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

As described herein, mechanisms of the illustrated embodiment provide a solution for text segmentation for topic modelling by a processor. Real-time conversation data may be analyzed and time intervals between messages of the conversation data may be recorded. Each of the messages may be classified into a first group or a second group according to the analyzing. One or more topic modelling operations may be enhanced for text segmentation using the first group and the second group. After the conversation data has been segmented and grouped into either bursts or reflections, the bursts and reflections may be topic modelled. The results of topic modelling the bursts and reflections may then be aggregated. The terms output from a topic model operation is designed to give a user an indication of the terms used in a text corpus (and not necessarily as a readable summary).

In one aspect, real-time conversation data may be analyzed and time intervals between messages of the conversation data may be recorded. Each of the messages may be defined (and/or segmented) as burst segments or reflection segments according to the analyzing. One or more topic modelling operations may be enhanced for text segmentation using the burst segments or reflection segments.

Figure 4:
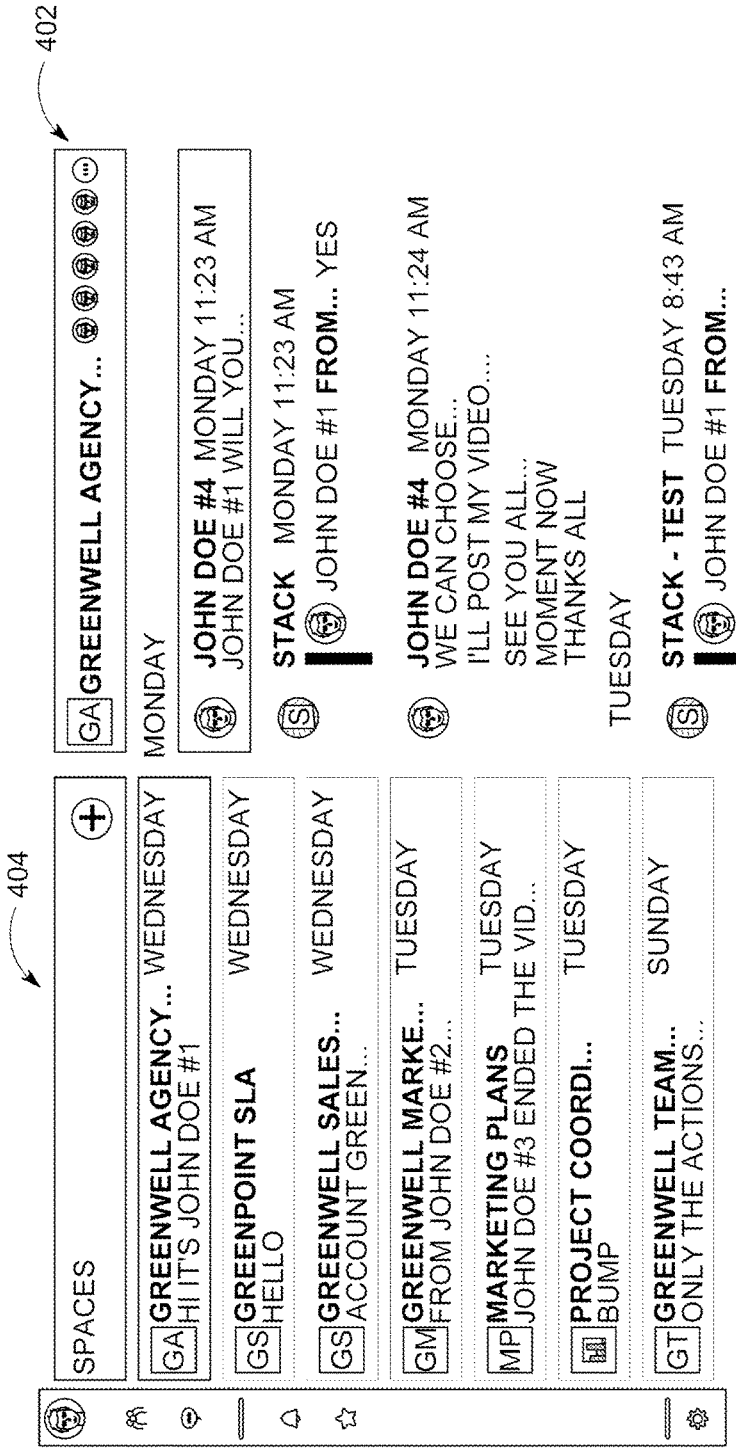
FIG. 4 is an additional diagram depicting analyzing real-time conversation data and recording inter-arrival times between messages in accordance with aspects of the present invention.

Turning now to FIG. 4, a block diagram 400 depicts analyzing real-time conversation data and recording inter-arrival times. In one aspect, one or more of the components, modules, services, applications, and/or functions described in FIGS. 1-3 may be used in FIGS. 4-8. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality. With the foregoing in mind, the module blocks 400 may also be incorporated into various hardware and software components of a system for topic kernelization in accordance with the present invention. Many of the functional blocks 400 (such as, for example, those within computer system/server 12) may execute as background processes on various components, either in distributed computing components, or on the user device, or elsewhere. In one aspect, the computer system 12 (see FIG. 1) may be used (along with one or more other features, aspects, components, and/or hardware/software of FIGS. 2-3) for topic kernelization.

At block 402, real-time conversation data (e.g., real-time chat messages) (of one or more users or groups, entities, or other participants in the real-time conversation of block 404) may be analyzed. The time intervals between messages of the conversation data may be determined and recorded, as in block 406. As indicated in block 406, the recorded time intervals show recorded intervals that show consistent time intervals, sporadic or lengthy time intervals, and/or repeated "bursts" between messages. For example, in line one "hard shapers", the recorded time intervals show recorded intervals where a time interval between the end of one message to the end of a second message may be 0.67 milliseconds. In one aspect, hard shapers may refer to a uniform distribution of conversation messages (e.g., chat messages) such as, for example, messages that have a constant inter-arrival time over a collected time period. In one aspect, inter-arrival time may be the time between the messages' (or objects) arrivals or the time between arrival of a message and a next message. In other words, the inter-arrival time may be defined as the amount of time between the arrival of one communication message (e.g., one real-time chat message) and the arrival of the next communication message (e.g., the next real-time chat message).

In line two "fluctuation", the recorded time intervals show recorded intervals that are fluctuated and/or have inconsistent time intervals between one message and the next message. In line three "burst", the recorded time intervals show recorded intervals that are "bursts" where a series of messages (after a first message and a time delay) are repeated during a 10 ms time period.

Figure 5:
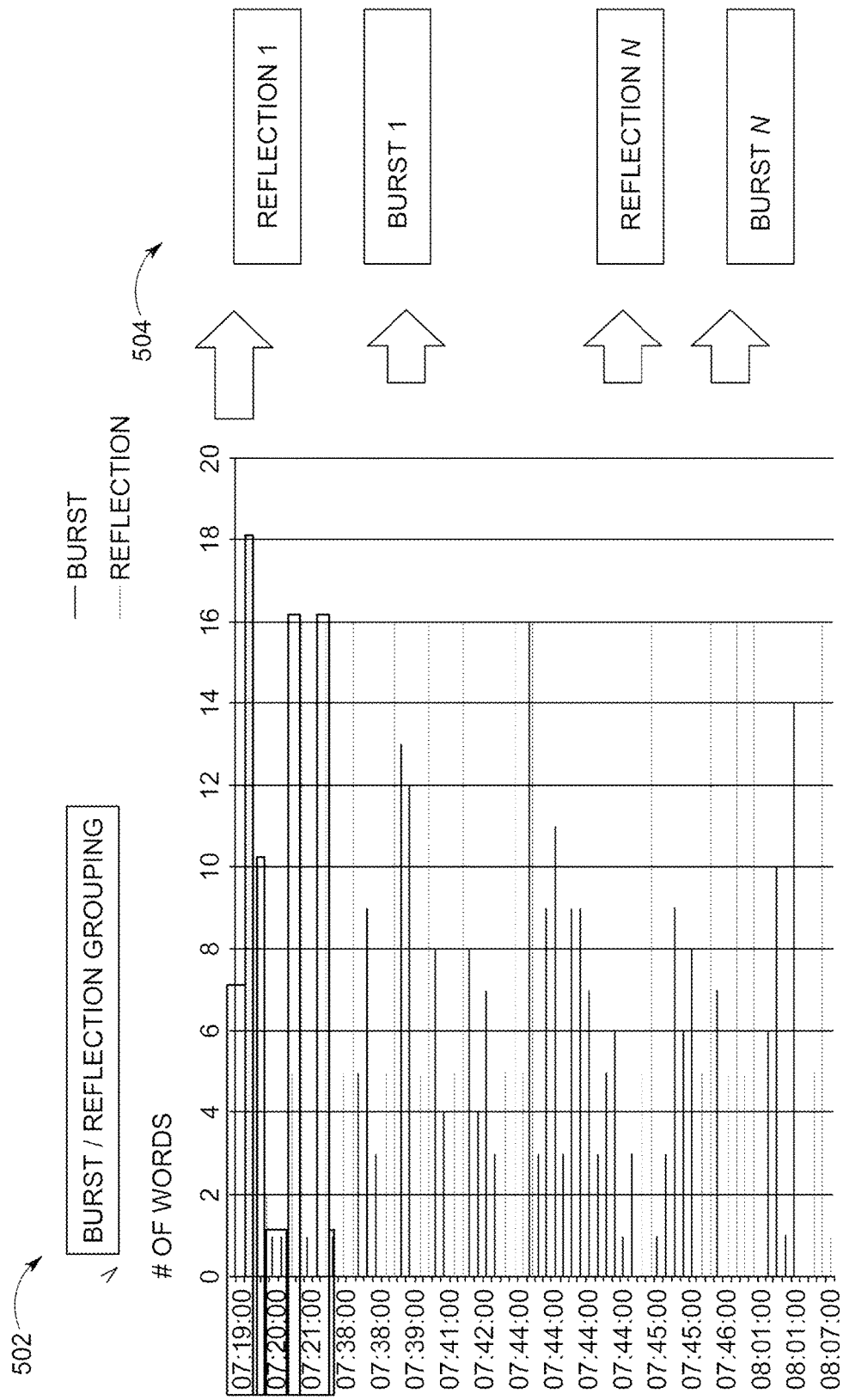
FIG. 5 is a diagram depicting messages grouped into two groups upon analyzing the real-time conversation data from FIG. 4 in accordance with aspects of the present invention.

Turning now to FIG. 5, diagram 500 depicts grouping the messages into two groups upon analyzing the real-time conversation data in FIG. 4. Accordingly, each of the recorded messages analyzed from FIG. 4 may be grouped into a first group (e.g., a burst) or a second group (reflections) according to the analyzing. As depicted, by way of example only, a graph 502 depicts a time interval on the y-axis and the number of words of each message on the x-axis. The highlighted sections of the graph 502 are used for illustration purposes only for various messages. The messages may be grouped into the two groups 504 of burst segments or reflection segments.

For example, diagram 500 depicts those messages occurring during a selected time period (e.g., less than 15 seconds) as bursts such as burst 1, . . . , burst n, and those occurring outside of the selected time period (e.g., equal to or more than 15 seconds) are grouped in a reflection group such as, for example, reflection 1, . . . , reflection n, as shown in the two groups 504.

Turning now to FIG. 6, diagram 600 depicts a summary of text mining analysis. After the conversation data has been segmented and grouped into either bursts or reflections from FIGS. 4 and 5, the bursts and reflections may be topic modelled. The results of topic modelling the bursts and reflections may be aggregated. The data of each group of bursts and reflections may be analyzed individually. For example, there may be 10 bunches of data in the burst group and 5 in the reflection group. For each bunch of the burst group and reflection group, a topic model such as, for example, LDA, Biterm, and the like may be used. That is, for each bunch of the burst group and reflection group, the present invention may select a topic cluster size, select a topic term size, determine (or calculate) a percentage ("%") of unique stop words, and/or alter the topic cluster size and topic term size and then repeat until the percentage of unique stop words are maximized. The results, for example, may be displayed in a summary such as, for example, summary 600. In one aspect, the summary illustrates the number of clusters, cluster terms, total terms analyzed, unique term output, total unreferenced terms, percentage of unique (or total) terms, percentage of unique or non-stopped words, and percentage of unique words or stop words, and/or a variety of other defined summary topics or terms. The topic model operations are developed and designed (using the group of burst and group of reflection segments) to provide a user an indication of the terms used in a text corpus (and not necessarily as a readable summary).

FIG. 7 is a diagram 700 depicting exemplary pseudocode results using topic modelling operations. The depicted pseudocode 700 illustrates, by way of example only, the use of 10 bunches of data in the burst group and 5 in the reflection group. The results of using the burst/reflection groups, to enhance topic modelling, in comparison to either segmentation based on time or the whole corpus, results in a reduced set of duplicate words within the resulting analysis.

As a final operation, FIG. 8 depicts an output of the entire analysis process described in FIGS. 4-8. For example, the resized topic models (from operation of FIG. 6) may be used by topic modelling operations (i.e., Biterm, LDA, and the like) to yield a higher precision of summary whilst respecting context. As depicted in FIG. 8, diagram 800 depicts an output from topic modelling of a) an entire conversation and b) conversation modelled using bursts and reflections, as described herein. That is, diagram 800 depicts an analysis of the entire conversation, an analysis of bursts and reflections, and an indication/results showing an increase of at least fifteen to twenty percent more terms are available for analysis.

Figure 9:
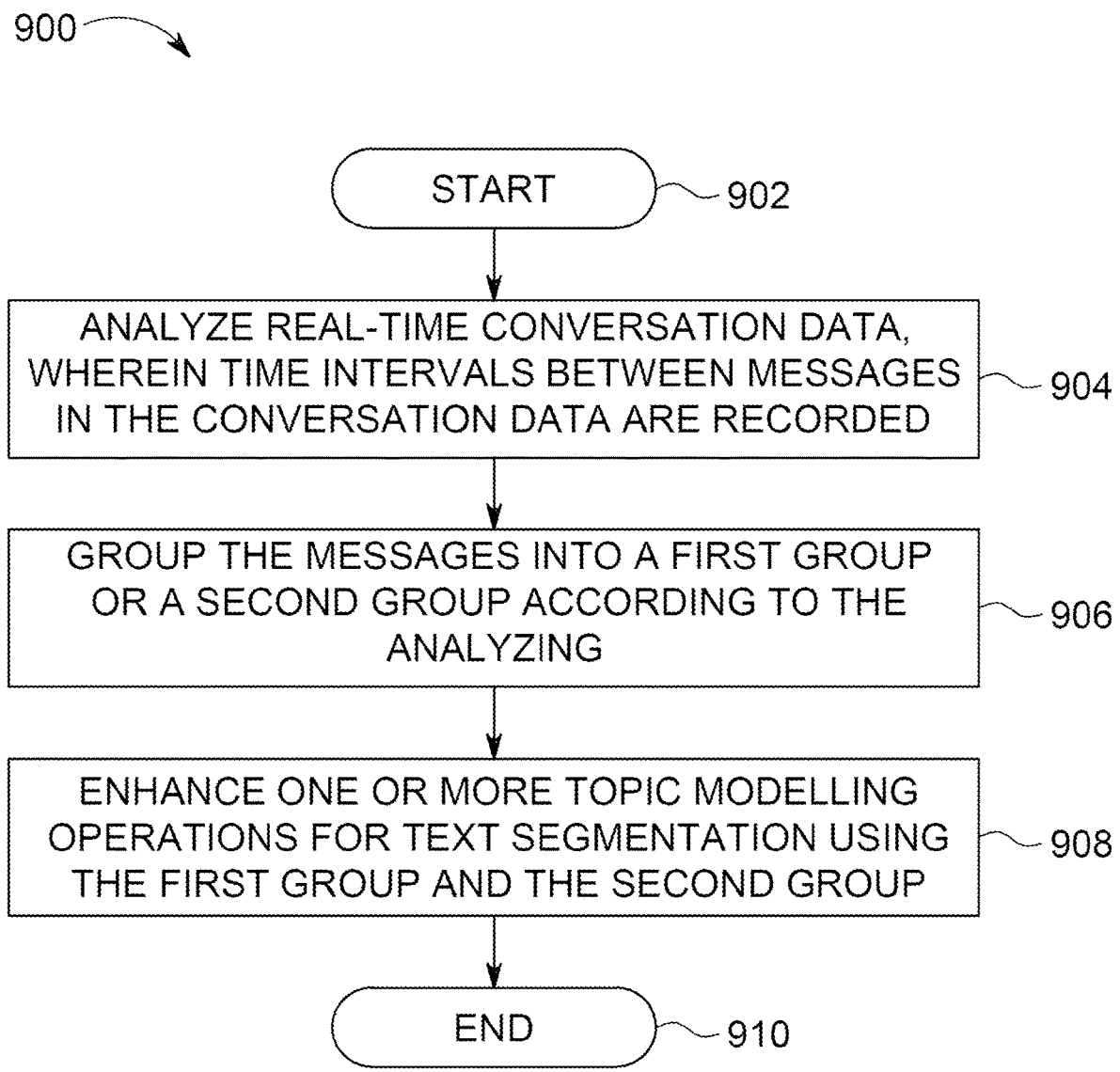
FIG. 9 is a flowchart diagram depicting an exemplary method for text segmentation for topic modelling by a processor; again, in which aspects of the present invention may be realized.

Turning now to FIG. 9, a method 900 for text segmentation for topic modelling by a processor is depicted, in which various aspects of the illustrated embodiments may be implemented. That is, FIG. 9 is a flowchart of an additional example method 900 for topic kernelization for real-time conversation data in a computing environment according to an example of the present invention. The functionality 900 may be implemented as a method executed as instructions on a machine, where the instructions are included on at least one computer readable medium or one non-transitory machine-readable storage medium. The functionality 900 may start in block 902. Real-time conversation data may be analyzed and time intervals between messages of the conversation data may be recorded, as in block 904. Each of the messages may be classified (or segmented or defined) into a first group or a second group according to the analyzing, as in block 906. In other words, the messages may be defined as a burst segments or reflection segments. One or more topic modelling operations may be enhanced (and/or developed) for text segmentation using the first group and the second group, as in block 908. The functionality 900 may end in block 910.

In one aspect, in conjunction with and/or as part of at least one block of FIG. 9, the operation of 900 may include one or more of each of the following. The operation of 900 may analyze the first group and the second group. The first group may be a burst group of occurring messages within a selected time period and the second group may be a reflection group of occurring messages outside of a selected time period. The first group and the second group may be used to determine optimal topic model sizes. The operation of 900 may use the one or more enhanced topic models (e.g., a topic model operation using the first group and the second group) for selecting a topic cluster size, selecting a topic term size, determining a percentage of unique stop words, and/or altering a topic cluster size and a topic term size until a percentage of unique stop words are maximized.

Figure 10:
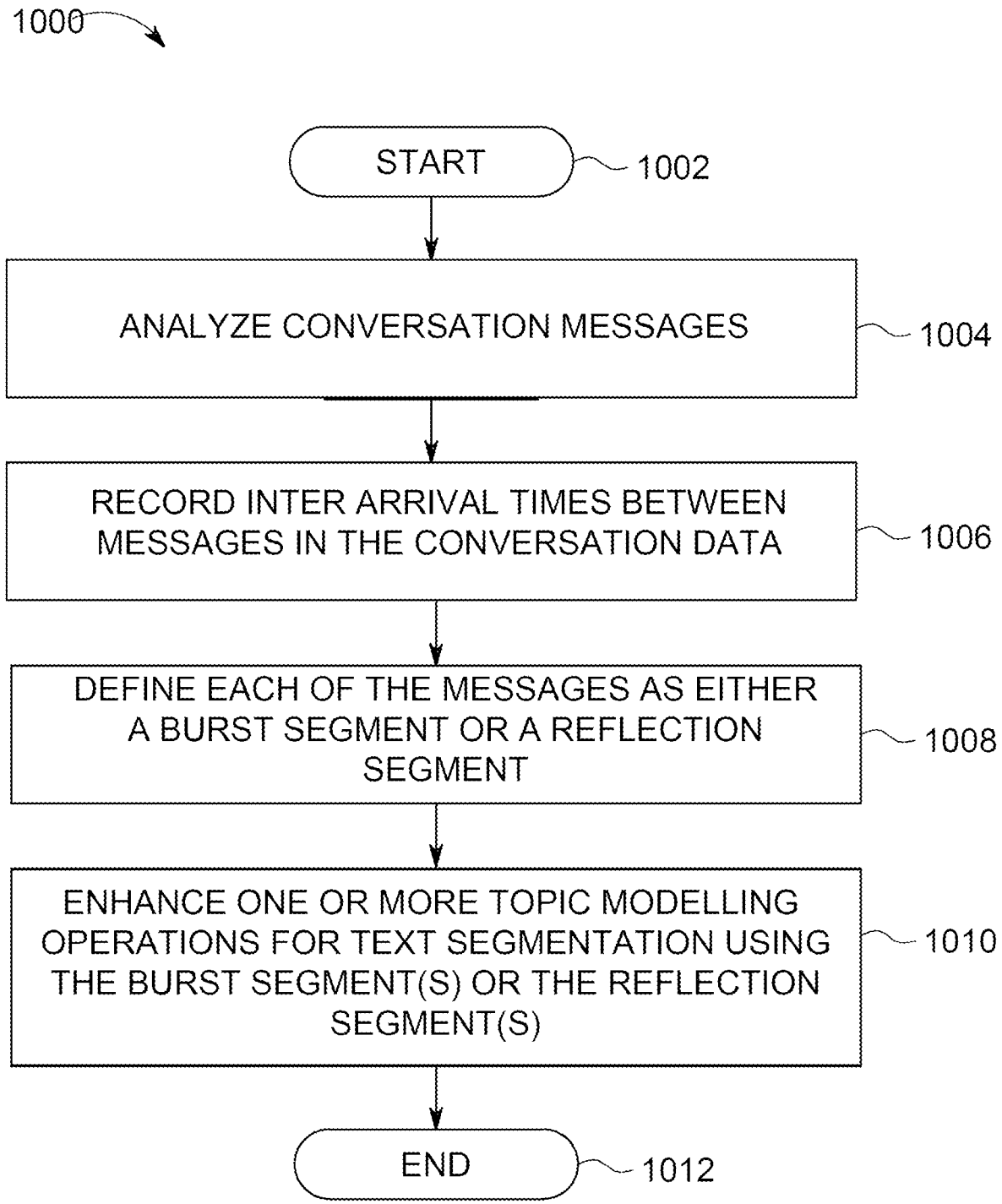
FIG. 10 is a flowchart diagram depicting an exemplary method for topic kernelization for real-time conversation data by a processor; again, in which aspects of the present invention may be realized.

Turning now to FIG. 10, a method 1000 for text kernelization by a processor is depicted, in which various aspects of the illustrated embodiments may be implemented. That is, FIG. 10 is a flowchart of an additional example method 1000 for topic kernelization for real-time conversation data in a computing environment according to an example of the present invention. The functionality 1000 may be implemented as a method executed as instructions on a machine, where the instructions are included on at least one computer readable medium or one non-transitory machine-readable storage medium. The functionality 1000 may start in block 1002. Conversation data (e.g., real-time chat messages) may be analyzed, as in block 1004. Time intervals (e.g., inter-arrival times) between messages of the conversation data may be recorded, as in block 1006. Each of the messages may be defined (or segmented into) as a burst segment or a reflection segment according to the analyzing and recording, as in block 1008. One or more topic modelling operations may be enhanced (and/or developed) for text segmentation using the burst segment(s) or reflection segment(s), as in block 1010. The functionality 1000 may end in block 1012.

In one aspect, in conjunction with and/or as part of at least one block of FIG. 10, the operation of 1000 may include one or more of each of the following. The operation of 1000 may analyze the burst segments or reflection segments. The burst segments are messages within a selected time period and the reflection segments are messages occurring after a selected time period. The burst segments and/or reflection segments may be used to determine optimal topic model sizes. The operation of 1000 may use the one or more enhanced topic models (e.g., a topic model operation using the first group and the second group) for selecting a topic cluster size, selecting a topic term size, determining a percentage of unique stop words, and/or altering a topic cluster size and a topic term size until a percentage of unique stop words are maximized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks that may be shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for text segmentation for topic modelling by a processor, comprising:
implementing a machine learning mechanism to enhance one or more topic modelling operations of collected real-time conversation data, the real-time conversation data classified into burst segments and reflection segments; wherein the burst segments comprise successive messages received into the real-time conversation data within a first time interval and the reflection segments comprise multiple messages each received into the real-time conversation data having an inter-arrival time outside the first time interval, and wherein enhancing the one or more topic modelling operations includes:
grouping the classified burst segments and the classified reflection segments, respectively,
individually modelling each of the groupings of the burst segments and the reflection segments, and
aggregating terms modelled from each of the individual modellings prior to enhancing the one or more topic modelling operations inclusive of the individual modellings by the machine learning mechanism; and
presenting, via a display, a summary of the one or more topic modelling operations to a user according to an output of a text mining analysis implementing the one or more topic modelling operations enhanced by the machine learning mechanism.

2. The method of claim 1, wherein the summary is representative of an indication of certain characteristics of various terms or words used in a text corpus associated with the real-time conversation data.

3. The method of claim 1, further including using the burst segments or reflection segments to determine optimal topic model sizes.

4. The method of claim 1, further including selecting a topic cluster size using the one or more enhanced topic modelling operations.

5. The method of claim 1, further including selecting a topic term size using the one or more enhanced topic modelling operations.

6. The method of claim 1, further including determining a percentage of unique stop words.

7. The method of claim 1, further including altering a topic cluster size and a topic term size until a percentage of unique stop words are maximized.

8. A system for text segmentation for topic modelling in a computing environment, comprising:
one or more computers with executable instructions that when executed cause the system to:
implement a machine learning mechanism to enhance one or more topic modelling operations of collected real-time conversation data, the real-time conversation data classified into burst segments and reflection segments; wherein the burst segments comprise successive messages received into the real-time conversation data within a first time interval and the reflection segments comprise multiple messages each received into the real-time conversation data having an inter-arrival time outside the first time interval, and wherein enhancing the one or more topic modelling operations includes:
grouping the classified burst segments and the classified reflection segments, respectively,
individually modelling each of the groupings of the burst segments and the reflection segments, and
aggregating terms modelled from each of the individual modellings prior to enhancing the one or more topic modelling operations inclusive of the individual modellings by the machine learning mechanism; and
present, via a display, a summary of the one or more topic modelling operations to a user according to an output of a text mining analysis implementing the one or more topic modelling operations enhanced by the machine learning mechanism.

9. The system of claim 8, wherein the summary is representative of an indication of certain characteristics of various terms or words used in a text corpus associated with the real-time conversation data.

10. The system of claim 8, wherein the executable instructions when executed cause the system to use the burst segments or reflection segments to determine optimal topic model sizes.

11. The system of claim 8, wherein the executable instructions when executed cause the system to select a topic cluster size using the one or more enhanced topic modelling operations.

12. The system of claim 8, wherein the executable instructions when executed cause the system to select a topic term size using the one or more enhanced topic modelling operations.

13. The system of claim 8, wherein the executable instructions when executed cause the system to determine a percentage of unique stop words.

14. The system of claim 8, wherein the executable instructions when executed cause the system to alter a topic cluster size and a topic term size until a percentage of unique stop words are maximized.

15. A computer program product for, by a processor, text segmentation for topic modelling, the computer program product comprising a non-transitory computer-readable storage medium having computer-readable program code portions stored therein, the computer-readable program code portions comprising:

an executable portion that implements a machine learning mechanism to enhance one or more topic modelling operations of collected real-time conversation data, the real-time conversation data classified into burst segments and reflection segments; wherein the burst segments comprise successive messages received into the real-time conversation data within a first time interval and the reflection segments comprise multiple messages each received into the real-time conversation data having an inter-arrival time outside the first time interval, and wherein enhancing the one or more topic modelling operations includes:

grouping the classified burst segments and the classified reflection segments, respectively, individually modelling each of the groupings of the burst segments and the reflection segments, and aggregating terms modelled from each of the individual modellings prior to enhancing the one or more topic modelling operations inclusive of the individual modellings by the machine learning mechanism; and an executable portion that presents, via a display, a summary of the one or more topic modelling operations to a user according to an output of a text mining analysis implementing the one or more topic modelling operations enhanced by the machine learning mechanism.

16. The computer program product of claim 15, wherein the summary is representative of an indication of certain characteristics of various terms or words used in a text corpus associated with the real-time conversation data.

17. The computer program product of claim 15, further including an executable portion that uses the burst segments or reflection segments to determine optimal topic model sizes.

18. The computer program product of claim 15, further including an executable portion that selects a topic cluster size using the one or more enhanced topic modelling operations.

19. The computer program product of claim 15, further including an executable portion that:

selects a topic term size; and determine a percentage of unique stop words.

20. The computer program product of claim 15, further including an executable portion that alters a topic cluster size and a topic term size until a percentage of unique stop words are maximized.

\* \* \* \* \*